United States Patent [19]

Groteke et al.

[11] 4,440,640

[45] Apr. 3, 1984

[54] HOIST TO BE USED IN COMBINATION WITH MOLTEN METAL FILTERING APPARATUS

[75] Inventors: Daniel E. Groteke, 8 E. Lakeview Dr., Apt. #4, Cincinnati, Ohio 45237; Maurice R. Meeker, Monroe, Ohio

[73] Assignee: Daniel E. Groteke, Cincinnati, Ohio

[21] Appl. No.: 368,109

[22] Filed: Apr. 14, 1982

[51] Int. Cl.³ ............................................ B01D 29/38
[52] U.S. Cl. .................................... 210/237; 210/388; 210/409; 210/510.1
[58] Field of Search ............... 210/773, 774, 791, 172, 210/236–238, 388, 389, 409, 510; 212/199–203, 223, 250, 251

[56] References Cited

U.S. PATENT DOCUMENTS

| 694,866 | 3/1902 | Kaschewitz et al. | 212/200 X |
| 1,023,006 | 4/1912 | Carriker | 212/199 |
| 1,078,998 | 11/1913 | Ernst | 212/199 X |
| 1,163,786 | 12/1915 | Smith | 212/201 |
| 1,430,200 | 9/1922 | Tiemann | 210/791 X |
| 1,607,013 | 11/1926 | Meyerhofer | 210/388 |
| 2,990,238 | 6/1961 | Kabisch et al. | 210/791 X |
| 3,181,707 | 5/1965 | Janssen | 212/202 |
| 3,841,488 | 10/1974 | Yessaian | 210/388 X |
| 4,052,198 | 10/1977 | Yarwood et al. | 210/773 X |
| 4,246,106 | 1/1981 | Dolgov et al. | 210/774 |

FOREIGN PATENT DOCUMENTS

| 806356 | 6/1951 | Fed. Rep. of Germany | 210/237 |
| 28226 | 11/1932 | Netherlands | 210/238 |

Primary Examiner—Robert H. Spitzer
Attorney, Agent, or Firm—Janine J. Weins; Michael J. Weins

[57] ABSTRACT

The present invention relates to a hoist to be used in combination with an apparatus for filtering molten metal. The hoist of the present invention is used both to position the filtering vessel, and to back-flushing metal through the filter element. The present invention also relates to the method of back-flushing. Back-flushing serves to dislodge particulate and thereby clean the filter element. When the filtering vessel is submerged in a molten metal bath back flushing serves to aid the exchange of the molten metal interior to the filtering vessel with the molten metal exterior to the filtering vessel, and in so doing aids in minimizing the temperature difference between molten metal interior and exterior to the molten metal filtering vessel. Periodic back-flushing significantly extends the life of the molten metal filtering apparatus.

12 Claims, 6 Drawing Figures

HOIST TO BE USED IN COMBINATION WITH MOLTEN METAL FILTERING APPARATUS

DESCRIPTION

Field of Invention

The present invention relates to a hoist to be used in combination with an apparatus for filtering molten metal. The hoist is used both to position the filtering vessel, and to back-flushing metal through the filter element. The present invention also relates to the method of back-flushing.

Background Art

Molten metal, and in particular molten aluminum, frequently contains impurities which are detrimental to the resulting cast products. These impurities may be oxides of the metal, inclusions introduced by fluxes used during melting, or products formed by interaction with the furnace lining.

Several techniques are taught for removing the oxides and other impurities from molten metal by filtering the molten metal. Techniques for removing oxides and other impurities from molten metal are taught in U.S. application Ser. No. 256,829 filed Apr. 23, 1981, now U.S. Pat. No. 4,394,271, and in two co-pending applications by one of the inventors of the present invention. These techniques teach using a molten metal filtering apparatus which comprises a filtering vessel fitted with a filter element made from porous filter material to filter molten metal. When the filtering apparatus is used to filter metal contained in a molten metal bath the filtering vessel is mounted so as to maintain the filter element and a portion of the filtering vessel submerged in the bath of molten metal, while the rim of the filtering vessel is maintained above the surface of the molten metal. Molten metal flows through the filter element into the filtering vessel. Filtered metal may be extracted from the filtering vessel by a ladle. As the molten metal flows through the filter element into the filtering vessel some of the impurities such as oxides of the metal, inclusions introduced by fluxes, particulate present in the scrap, and the products formed by interaction with the furnace lining tend to plug the pores of the filter element. When the pores of the filter element are plugged to such a degree that during operation metal is removed from the filtering vessel faster than the filtering vessel can fill with metal it has been the practice to replace either the filtering apparatus including the filter element, or to replace the filter element.

When a molten metal stream is filtered an in-line molten metal filtering apparatus consisting of a filtering vessel fitted with a filter element, interrupts the molten metal stream. The molten metal is filtered by flowing into the filtering vessel, through the filter element and out the bottom of the filtering vessel. Filtered molten metal collects beneath the filtering vessel. As in the case of the filtering vessel used in a molten metal bath, the pores of the filter element will tend to plug during service. When the filter element of an in-line filtering apparatus has plugged to the extent that metal enters the filtering vessel faster than the metal can flow from the filtering vessel it has been the practice to replace either, the filtering apparatus including the filter element, or to replace the filter element.

Summary of Invention

The present invention provides a hoist which can be used both for positioning an apparatus for filtering molten metal, and for back-flushing molten metal through the filter element of the apparatus. Back-flushing aides in cleaning the filter element by dislodging particulate that has built up within the pores of the filter element, and promotes the interchange of the molten metal in the bath surrounding the filtering vessel with molten metal contained within the filtering vessel. This interchange serves to minimize the temperature difference between the molten metal exterior to the filtering vessel, and the molten metal contained within the filtering vessel. The hoist of the present invention may optionally be provided with means for imparting controlled cyclic motion during back-flushing.

The hoist of the present invention has a vertical member. The vertical member is mounted in a stand. An extension arm is attached to the vertical member by a coupling slidably connected to the vertical member. The filtering vessel is attached to the extension arm. The extension arm moves relative to the vertical member in such a way as to raise and lower the filtering vessel. This movement of the extension arm with respect to the vertical member may be used for positioning of the filtering apparatus, and for back-flushing molten metal through the filter element. Means for raising and lowering the extension arm relative to the vertical member are provided and may include a winch, a rack and pinion, or a cylinder. These means may be activated by a mechanical crank, a reversing motor, or an electro-mechanical circuit. Additional means may be provided for imparting controlled cyclic motion to the filtering apparatus for back-flushing molten metal through the filter element, these means include an off set cam, a slider-crank, and a timing circuit which reverses the current supplied to a reversing motor which can be used to activate the winch or the pinion gear. Means for permitting movement of the extension arm relative to the vertical member include a slip collar, or roller bearings.

It is preferred that the vertical member be pivotally mounted in a stand in such a manner that the filtering apparatus can be rotated with respect to, or swung from over the liquid metal bath.

The present invention is also directed to a method for cleaning the filter element in an apparatus for filtering molten metal. Cleaning the filter element is accomplished by back-flushing molten metal through the filter element. The back-flushing is accomplished by moving the filter element relative to a bath of molten metal. Movement of the filter element relative to a bath of molten metal causes particulate trapped within the pores of the filter element to be dislodged. Periodic cleaning of the filter element can significantly extend the life of the filtering element and the apparatus used for filtering molten metal.

When a molten metal filtering apparatus is used to filter molten metal contained in a bath of molten metal, back-flushing can be achieved by movement of the filtering vessel within the molten metal bath. When a molten metal filtering apparatus is used to filter molten metal by interrupting the path of a flowing molten metal stream, back-flushing can be accomplished during preheating of the molten metal filtering apparatus. The molten metal filtering apparatus can be preheated, as is taught in a co-pending application by one of the inventors of the present invention, entitled "Apparatus and Method for Filtration of a Molten Metal Stream", application Ser. No. 368,158 filed Apr. 14, 1982 by placing the filtering apparatus in a molten metal bath contained in an auxiliary furnace. Moving the filtering apparatus relative to the bath of molten metal used for preheating will serve to dislodge particulate trapped within the pores of the filter element. Molten metal can be ladled from the filtering vessel and pigged for scrap if the metal contained within the filtering vessel after back-flushing contains an unacceptable level of particulate, or in the alternative the filtering vessel may be tilted to allow molten metal to flow from the filtering vessel.

BEST MODES OF CARRYING THE INVENTION INTO PRACTICE

Figure 1:
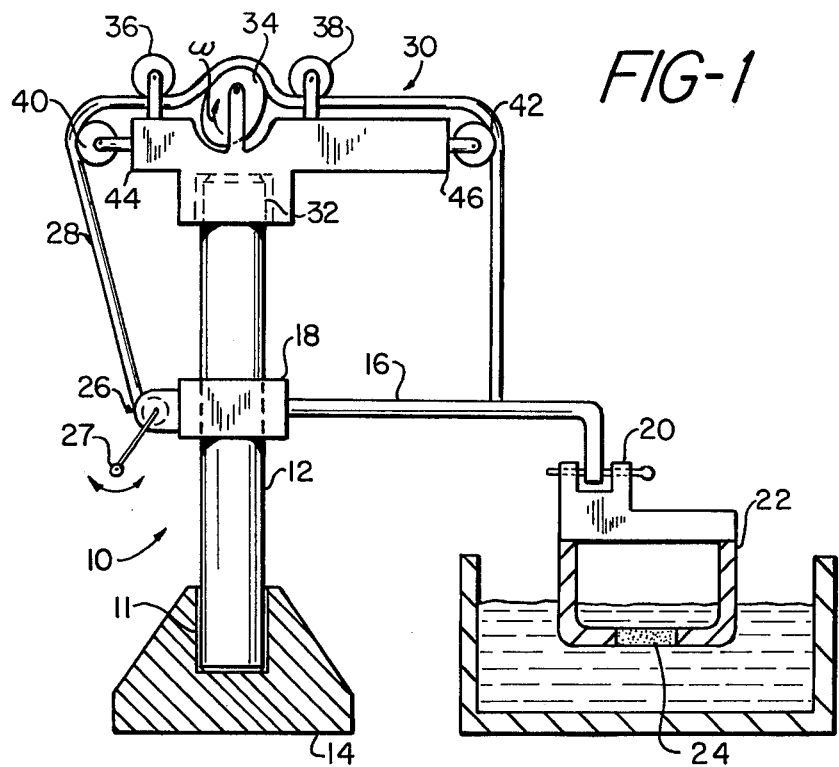
FIG. 1 is a schematic representation of one embodiment of the present invention in which a winch is used to position the filtering vessel and an optional cam is utilized to impart controlled cyclic motion to back-flush molten metal through the filter element.

FIG. 1 is a schematic represent of a hoist 10 of the present invention. The hoist 10 has a vertical member 12. The first end 11 of the vertical member 12 is rotatably mounted in a stand 14. The vertical member 12 is attached to an extension arm 16 by means of a coupling 18. Attached to the extension arm 16 by the use of a rigid coupler 20 is the filtering vessel 22.

The hoist 10 of the present invention can be used to both position the filtering vessel 22, and to cyclically move the filtering vessel 22 to effect back-flushing molten metal through the filter element 24. A variety of means can be used for position the filtering vessel 22. FIG. 1 depicts a winch 26 that can be rotated so as to raise and lower the filtering vessel 22. The winch 26 attaches to a cable 28 which passes over a cable guide 30. The cable guide 30 is connected to a second end 32 of the vertical member 12. The winch 26 may be hand operated by turning a winch handle 27, or in the alternative motor driven.

Cyclic motion is imparted to the filtering vessel 22 by raising and lowering the cable 28. This can be accomplished by turning the winch 26 first in one direction of rotation, then reversing the direction of rotation. Controlled cyclic motion can be imparted to the winch 26 by turning the winch 26 with an electric motor, not shown, which is controlled by programmed electro-mechanical circuitry. Optionally, a cam 34 can be provided to impart controlled cyclic motion to the filtering vessel 22. The cam 34 is mounted on the cable guide 30. The cam 34 can be rotated by a hand crank, or a motor can be connected to the cam 34 by appropriate linkage. Preferably cable followers 36, and 38 mounted on the cable guide 30 are provided to assure that the cable 28 follows the movement of the cam 34. Additional cable followers 40 and 42 mounted at the extremities 44 and 46 of the cable guide 30 can be provided to assure that the loading with respect to the winch 26 and the extension arm 16 is approximately vertical. When a cam 34 is used to impart cyclic motion it may be necessary to limit rotation of the winch 26 with respect to the cable 28. This can be accomplished by locking the winch handle 27, using a ratchet lock, or by other appropriate means.

Figure 2:
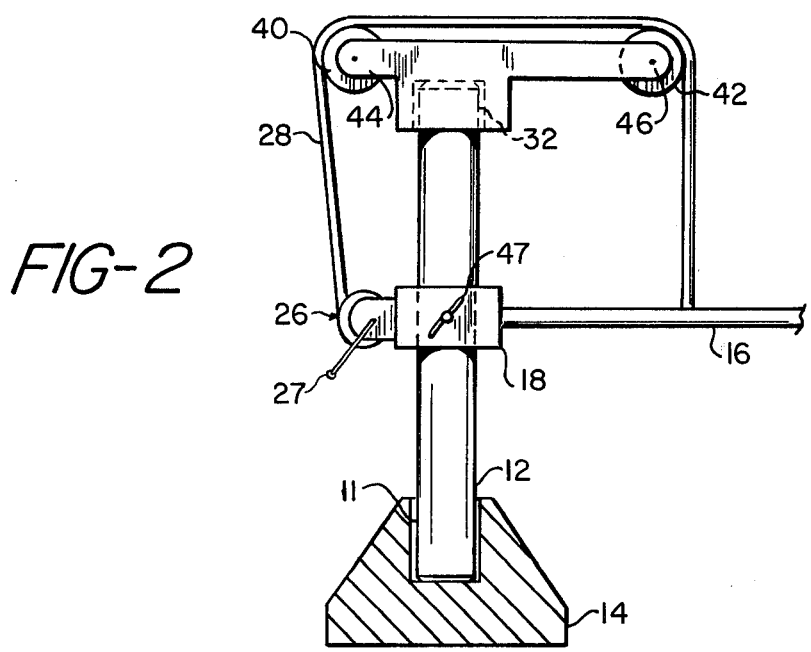
FIG. 2 is a schematic representation of a second embodiment of the present invention in which a winch is used to position the filtering vessel and to back-flush molten metal through the filter element.

FIG. 2 is an alternate configuration for the hoist illustrated in FIG. 1. In this configuration all motion imparted to the filtering vessel 22 is provided by the winch 26. Cyclic motion is imparted by rotating the winch handle 27 first in one direction of rotation, and then in the opposite direction of rotation. Means such as a set screw 47 can optionally be provided to lock the position of the coupling 18 with respect to the vertical member 12 during operation. The use of the set screw or other equivalent means eliminates the necessity of maintaining tension on the cable 28 during operation.

Figure 3:
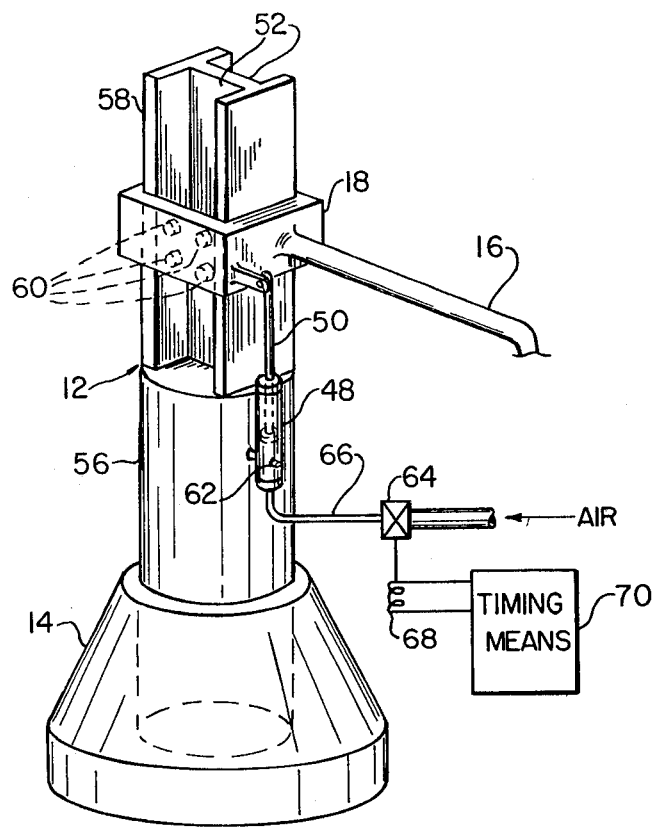
FIG. 3 is a schematic representation of a third embodiment of the present invention in which a cylinder is used to both position the filtering vessel and impart cyclic motion to the back-flushing molten metal through the filter element.

FIG. 3 depicts an alternate embodiment for the hoist of the present invention. In this embodiment movement of the extension arm 16 relative to the vertical member 12 is accomplished by the use of a pneumatic or hydraulic cylinder 48. The cylinder 48 is connected to the vertical member 12, while the plunger 50 of the cylinder 48 is connected to the coupling 18. The coupling 18 rides in a track 52 on the vertical member 12. In a preferred configuration a first segment 56 of the vertical member 12 is cylindrical, and slidably rotatably connected to the stand 14. A second segment 58 of the vertical member 12 has an I cross section. A section of an I-beam or an H-beam could be used for the second segment 58 of the vertical member 12. The channels of the second segment 58 serve as tracks 52 on which the coupling 18 rides. Roller bearings 60 can be provided to minimize friction between the coupling 18 and the second segment 58 of the vertical member 12.

Cyclic motion can be imparted by varying the pressure in the cylinder 48. The cylinder 48 is provided with a vent 62. This vent 62 can be adjusted to vary the leak rate of fluid from the cylinder 48. Varying the leak rate can vary the descent of the plunger 50. A control valve 64 is provided in the fluid line 66, the fluid line 66 supplies fluid to the cylinder 48. The control value 64 controls the injection of fluid into the cylinder 48, and thereby controls the motion of the plunger 50. Electronic circuitry not shown, can serve as a timing means to regulate the vent 62, and the control valve 64 to achieve controlled cyclic movement of the filtering vessel 22.

When the vent 62 has a fixed leak rate, the control valve 64 can be used to regulate the motion of the plunger 50. If the control valve 64 is operated as a line shut off valve then periodic motion can be achieved by the appropriately opening and closing of the control valve 64. In the open position pressurized fluid flow from the fluid line 66 into the cylinder 48, raising the plunger 50, this in turn raises the filtering vessel 22. When the control valve 64 is closed, fluid leaks from the cylinder 48 at a rate determined by the leak rate of the vent 62 and the filtering vessel 22 will lower. The control valve 64 can be activated by a solenoid 68. A timing means 70 can be used to periodically activate the solenoid 68 which in turn controls the flow of fluid to the cylinder 48. Using the timing means 70, controlled cyclic movement of the filtering vessel 22 can be achieved.

Figure 4:
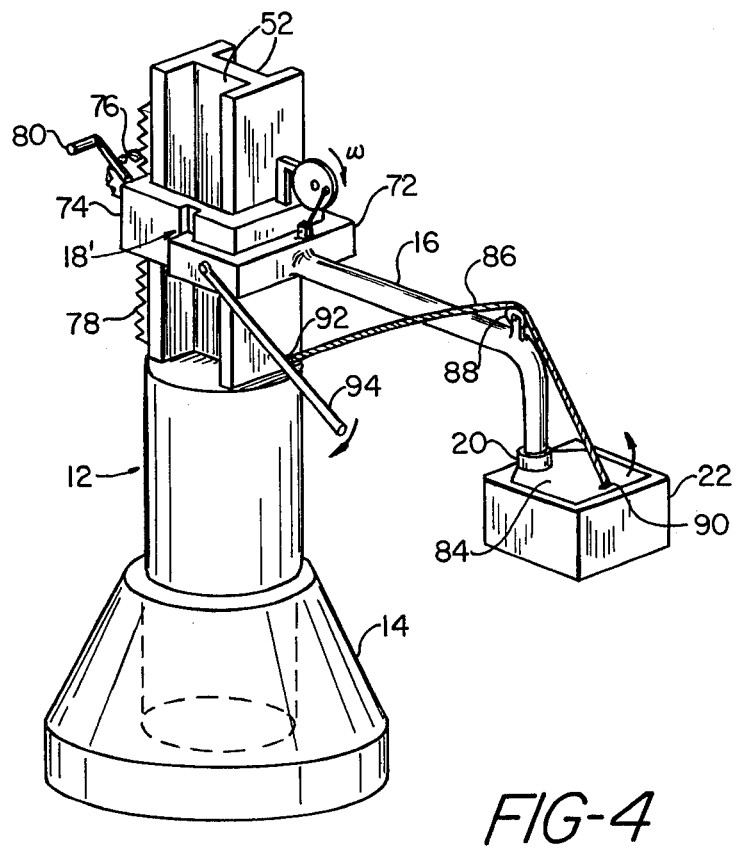
FIG. 4 is a schematic representation of a fourth embodiment of the present invention in which a rack and pinion is used to position the filtering vessel and a slider-crank is used to impart controlled cyclic motion to back-flush molten metal through the filter element.

FIG. 4 depicts a fourth embodiment of the present invention. In this fourth embodiment the extension arm 16 is rigidly attached to the first section 72 of a two part coupling 18'. The first section 72 of the coupling 18' is connected to second section 74 of the coupling 18' by means which permit controlled relative movement. The second section 74 of the coupling 18' is slidably mounted in a track 52 on the vertical member 12. Positioning of the filtering vessel 22 is accomplished by moving the second section 74 of the coupling 18' with respect to the vertical member 12. Movement of the coupling 18' with respect to the vertical member 12 is accomplished by turning a pinion gear 76 that meshes with a rack 78. The rack 78 is attached to the vertical member 12. The pinion gear 76 can be turned using a variety of means such as a hand crank 80 shown, or a motor not shown.

Controlled cyclic motion is imparted to the filtering vessel by a slider-crank 82. The slider-crank 82 couples to the first section 72 and the second section 74 of the coupling 18'. Rotation of the slider-crank 82 causes relative motion between the first section 72 and the second section 74 of the coupling 18'. During positioning of the filtering vessel 22 using the rack 78 and pinion 76 the slider-crank 82 is maintained stationary so as to fix the relative position of the first section 72 with respect to the position of the second section 74 of the coupling 18. Motion can be imparted to the slider-crank 82 by a hand crank or by a motor.

The molten metal contained within the filtering vessel 22 can be protected by a lid 84. The lid is hingeably connected to the rigid mounting 20. A lid cable 86 passes over a pulley 88. The pulley 88 is attached to the extension arm 16. The pulley 88 acts as a guide for the lid cable 86. A first end 90 of the lid cable 86 attaches to the lid 84, while a second end 92 of the lid cable 86 is attached to a lid activating lever 94 which is pivotally mounted to the first section 72 of the coupling 18'. Moving the lid activating lever 94 serves to raise and lower the lid 84.

Figure 5:
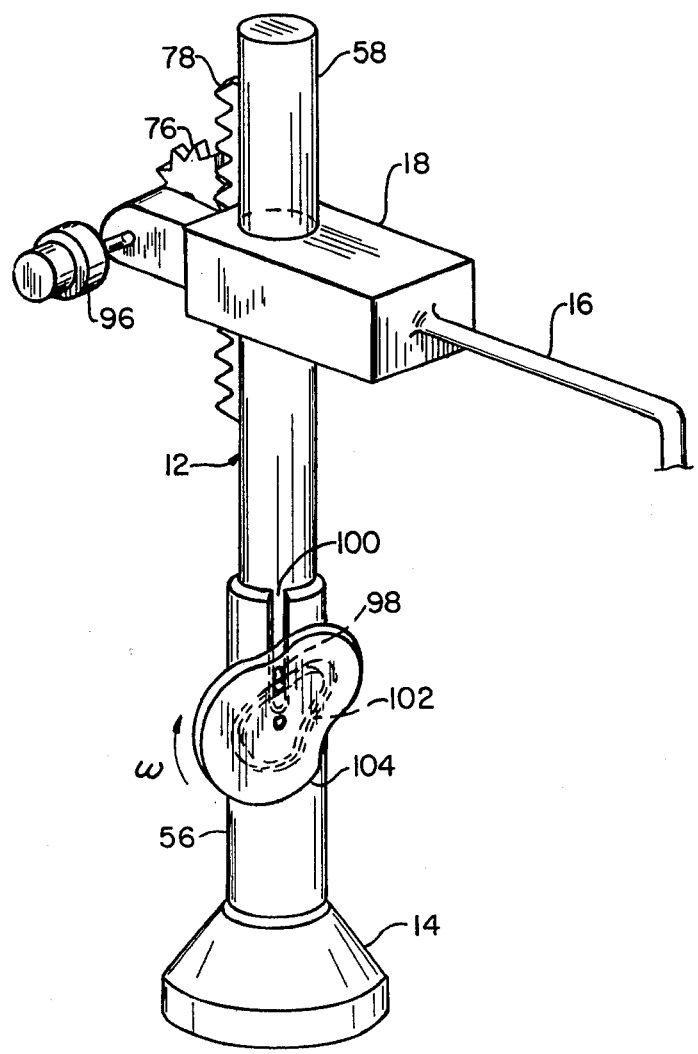
FIG. 5 is a schematic representation of a fifth embodiment of the present invention in which a rack and pinion is used to position the filtering vessel and a follower cam is used to impart controlled cyclic motion to the filtering vessel to back-flush molten metal through the filter element.

FIG. 5 depicts a fifth embodiment for the hoist 10 of the present invention. In this fifth embodiment the extension arm 16 is rigidly attached to a coupling 18. The coupling 18 is attached to a second segment 58 of the vertical member 12. Movement of the coupling 18 with respect to the vertical member 12 is achieved by turning a pinion gear 76 that meshes with a rack 78. The rack 78 is attached to the second segment of the vertical member 12. The pinion gear 76 can be turned using a variety of means, such as a motor 96 shown.

Cyclic motion can be imparted to the filtering vessel by turning the pinion gear 76 first in one direction of rotation, and then turning the pinion gear 76 in the reverse direction of rotation. When a motor 96 is used to rotate the pinion gear 76 controlled cyclic motion can be obtained by reversing the direction of rotation of the pinion gear 76 using the appropriate electromechanical circuitry.

Optionally, controlled cyclic motion can be imparted by having the second segment 58 of the vertical member 12 slidably attached to the first segment 56 of the vertical member 12 and providing a cam follower 98 attached to and protruding from the second segment 58 of the vertical member 12. The cam follower 98 rides in a slot 100 in the first segment 56 of the vertical member 12. Controlled cyclic motion of the second segment 58 is imparted by moving the cam follower 98 in a groove 102 contained in a drive cam 104. The drive cam 104 is mounted on the first segment 56 of the vertical member 12. Rotating the drive cam 104 causes the second segment 58 of the vertical member 12 to raise and lower, this in turn causes the filtering vessel 22 to be raised and lowered.

Figure 6:
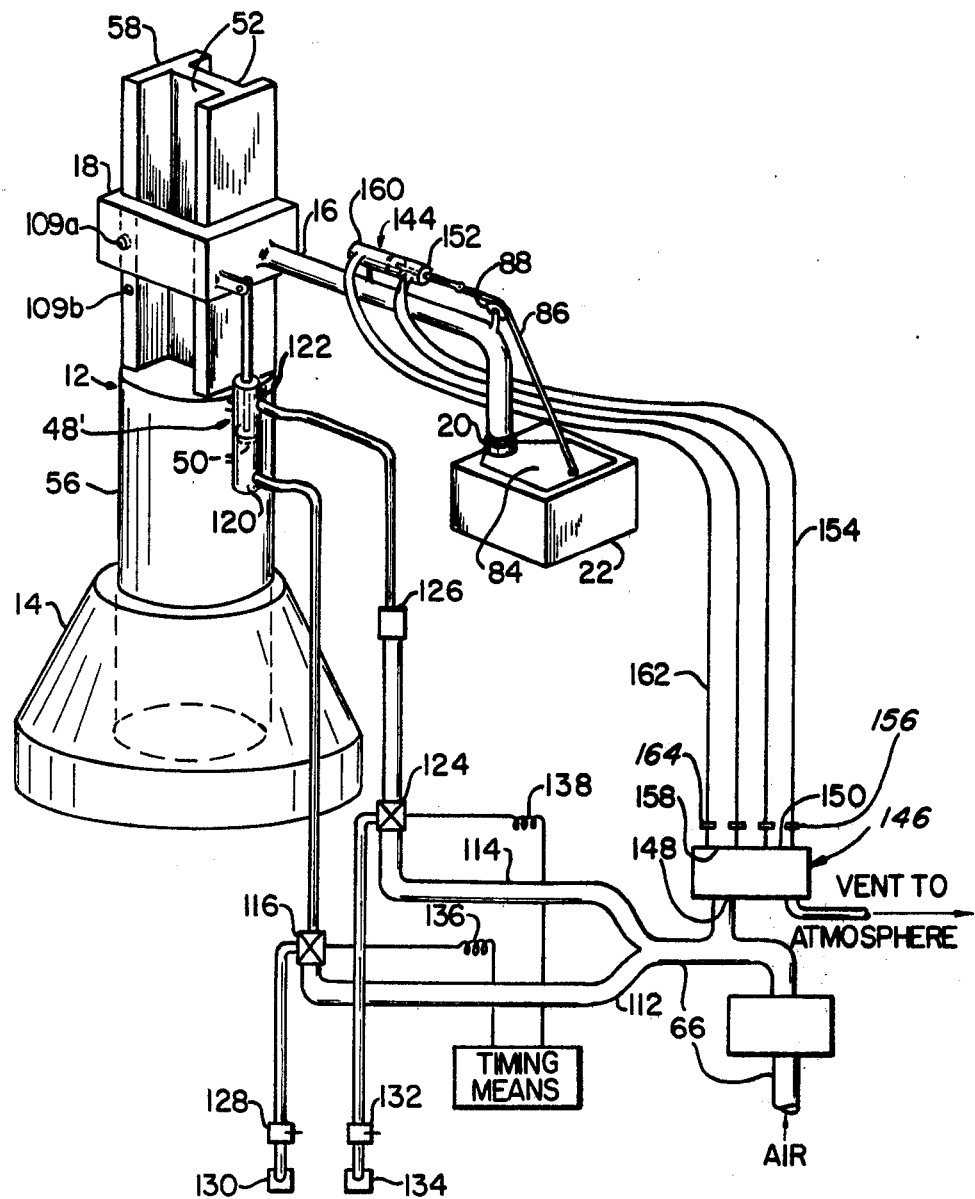
FIG. 6 is a schematic representation of a sixth embodiment of the present invention in which a cylinder pressurized on both sides of the piston is used to both position the filtering vessel and to impart controlled cyclic motion to back-flushing molten metal through the filter element, and a second cylinder is used to open and close a cover which is placed over the filtering vessel to protect the molten metal and limit thermal losses.

FIG. 6 is a schematic representation of the second embodiment of the present invention employing a pneumatic or hydraulic cylinder to raise and lower the filtering vessel, as well as for providing controlled cyclic motion. This embodiment differs from the embodiment of FIG. 3 in that in the embodiment in FIG. 6 the first cylinder 48' has a dual activated piston 50. The dual activated cylinder 48' provides positive control of the filtering vessel 22 at all times. Using the dual activated cylinder the filtering vessel 22 can be raised or lowered to any position. Cyclic motion with respect to any position can be imparted by alternately applying a differential excess pressure to first one side of the cylinder, and then the second side.

The position of the filtering vessel 22 with respect to the vertical member 12 can be secured by aligning a first hole 109a in the second segment 58 of the vertical member 12 with a second hole 109b in the coupling 18, and then inserting a pin, not shown, therethrough.

The fluid line 66, which supplies pressurized fluid to the first dual activated cylinder 48', is interrupted by a filtration, regulation and lubrication unit 110 which normalizes the pressure, filters the fluid, and adds lubricant to the fluid. The fluid line 66, after interruption by the filtration, regulation and lubrication unit 110, divides into a first fluid line segment 112, and a second fluid line segment 114. The first fluid line segment 112 passes through a first three way two position valve 116. The first fluid line segment 112 is connected to the lower chamber 120 of the cylinder 48'.

The second fluid line segment 114 connects the fluid line 66 with an upper chamber 122 of the cylinder 48'. The second fluid line segment 114 passes through a second three way two position valve 124. In the second fluid line segment 114, between the second three way two position valve 124 and the upper chamber 122 is a pressure regulator and reducer valve 126 which prevents surges in the fluid flow into the upper chamber 122. The pressure regulator and reducer valve 126 also reduces the pressure in the upper chamber 122 with respect to the lower chamber 120 to compensate for the weight of the coupling 18, the extension arm 16, the filtering vessel 22, and other elements supported by the extension arm 16.

When the three way valve 116 is in its first position the fluid line 66 communicates with the lower chamber 120. When the three way valve 116 is in the second position communication with the fluid line 66 is blocked, and the fluid in chamber 120 is vented through a first needle valve 128. When air is used the escaping air passes through a first muffler 130. The first needle valve 128 controls a leak and provides a downward movement of the piston 50 with a corresponding lowering of the filtering vessel 22. When the first three way valve is returned to its first position communication with the fluid line 66 is again established and motion of the piston 50 will stop.

When the second three way valve 124 is in its first position the fluid line 66 communicates with the upper chamber 122 via the pressure reducer 126. If the second three way valve 124 is in its second position communication between the fluid line 66 and the upper chamber 122 is blocked and the fluid in the second chamber is vented through a second needle valve 132, and when air is used the air passes through a second muffler 134.

Solenoids 136 and 138 are connected to the first three way valve 116 and the second three way valve 124 respectively. When the solenoids are activated they will switch their respective three way valves to the second positions. By providing a controlled sequence of activation and deactivation of the solenoids, cyclic motion can be imparted to the filtering vessel 22. This can be accomplished with a timing circuit not shown.

The filtering vessel 22 of FIG. 6 is fitted with a lid 84 as described with respect to FIG. 4. A cable 86 is employed to raise and lower the lid 84. The cable 84 is attached to a cylinder 142 of a second double activated cylinder 144. The second cylinder 144 is in turn attached to the extension arm 16. A four way two position valve 146 has its intake port 148 connected to the fluid line 66. The first output port 150 is connected to a lifting chamber 152 by a first connecting hose 154 having a first choke valve 156. The second output port 158 is connected to a closing chamber 160 via a second connecting hose 162 having a second choke valve 164.

When the four way valve 146 is in its first position the lifting chamber 152 will communicate with the fluid in the fluid line 66, while the closing chamber 160 will vent the fluid. The piston will move so as to expand the lifting chamber 152 and raise the lid 84 of the filtering vessel 22.

When the four way valve 146 is in its second position the lifting chamber 152 will vent the fluid, while the closing chamber 160 will communicate with the fluid in the fluid line 66. The fluid will move the piston so as to expand the closing chamber 160 and lower the lid 84 of the filtering vessel 22.

It should be pointed out that when either a double activated cylinder as shown in FIG. 6, a cam of the design shown of FIG. 5 or a slider crank such as shown in FIG. 4 is used, positive control of the displacement of the filtering vessel 22 is achieved. When a cam of the design shown in FIG. 1, or a cylinder as shown in FIG. 3 is used the lowering of the filtering vessel 22 will be a function of the settling rate of the filtering vessel 22. The settling rate of the filtering vessel 22 will be a function of the weight of the filtering vessel 22, the coupling 18, and the extension arm 16.

EXAMPLE I

A molten metal filtering apparatus was used to filter a bath containing molten ASTM 319.0 aluminum alloy. The filter element was furnished by Foseco and had 30 pores per inch. During production 400 lbs/hour were filtered. With out back-flushing the life of the filter element was 6 hours or 2,400 pounds.

A similar filter element was back-flushed using a hoist of the design shown in FIG. 2. The filtering vessel was raised 2 inches in elevation to back-flush metal through the filter element once each cycle. The time for each of the cycles was several minutes. Back-flushing according to this sequence was performed every 800 pounds, or 2 hours of operation. The filter life was extended to more than 80 hours, and more than 30,000 pounds of metal could be filtered with each filtering vessel back-flushed in this manner.

EXAMPLE II

A molten metal filtering apparatus was used to filter a bath containing molten ASTM 242.0 (Si 0.7% max, Fe 1.0% max, Cu 3.5-4.5%, Mn 0.35% max, Mg 1.2-1.8%, Cr 0.25% max, Ni 1.7-2.3%, Zn 0.35% max, Ti 0.25% max, Al bal.). The filter element was furnished by Foseco and had 30 pores per inch. During production a maximum of 450 lbs/hour were filtered. With out back-flushing the life of the filter element was approximately 8 hours or 3,500 pounds.

A similar filter element was back-flushed using a hoist of the design shown in FIG. 6. The filtering vessel was moved 2 inches during each back flushing cycle. The time for each of the cycles was approximately one minute in duration and 10 minutes in frequency. Back-flushing according to this sequence was performed every 75 pounds, or 10 minutes of operation. The filter life was extended to more than 100 hours of operation.

While the novel features of this invention have been described in terms of preferred embodiments and particular applications, it will be appreciated that various omissions and substitutions in form and in detail of the apparatus and method may be made by those skilled in the art without departing from the spirit of the invention.

What we claim:
1. A hoist system comprising:
   a stand;
   a vertical member having a first end and a second end, said first end being mounted to said stand;
   a coupling slidably connected to said vertical member;
   an extension arm attached to said coupling;
   means for raising and lowering said extension arm;
   a molten metal filtering vessel; and
   means for rigidly connecting said filtering vessel to said extension arm.
2. The hoist of claim 1 further comprising means for rotating said extension arm with respect to said stand.
3. The apparatus of claim 2 further comprising means for imparting controlled cyclic motion to said extension arm.
4. The apparatus of claims 1, or 2 wherein said means for raising and lowering said extension arm comprises:
   a winch attached to said coupling;
   a cable guide connected to said extension arm at said second end; and
   a cable attached to said winch, passing over said cable guide and attached to said extension arm.
5. The apparatus of claims 1 or 2 wherein said raising and lowering means comprises:
   a rack attached to said vertical member; and a pinion gear intermeshed with said rack and attached to said coupling.

6. The apparatus of claims 1, 2, or 3 wherein said raising and lowering means comprises:
 a cylinder attached to said vertical member; and
 a plunger which is slidable in said cylinder and is attached to said coupling.

7. The apparatus of claim 4 further comprising means for imparting cyclic motion to said filtering vessel, said means comprising:
 an off-set cam mounted so as to maintain the position of the cam relative to the second end of said column, and to maintain contact with said cable.

8. The apparatus of claim 5 wherein said means for imparting cyclic motion to said filtering vessel comprising:
 a cam mounted on said first end of said vertical member and in contact with said coupling.

9. The apparatus of claim 6 wherein said means for imparting cyclic motion to said filtering vessel comprising:
 a cam mounted on said first end of said vertical member and in contact with said coupling.

10. The apparatus of claim 5 wherein said coupling has a first section and a second section, said first section being connected to said extension arm, and said first section being slidably mounted to said second section, said second section being slidably mounted on said vertical member, and said means for imparting cyclic motion to said filtering vessel comprising:
 a slider crank mounted on said first section and attached to said second section.

11. The apparatus of claim 6 wherein said coupling has a first section and a second section said first section being connected to said extension arm, and said first section being slidably mounted to said second section, said second section being slidably mounted on said vertical member, said plunger being attached to said second section, and said means for imparting cyclic motion to said filtering vessel comprising:
 a slider crank mounted on said first section and attached to said second section.

12. The apparatus of claim 3 wherein said vertical member has a first vertical member and a second vertical member said first member being slidably connected to said second member, and said means for imparting cyclic motion to said filtering vessel comprising:
 a cam mounted on said first vertical member; and
 a cam follower mounted on said second vertical member.

* * * * *